United States Patent
Smolovich

(10) Patent No.: US 7,843,789 B2
(45) Date of Patent: Nov. 30, 2010

(54) MULTIPLE LAYER OPTICAL DISK, INFORMATION RECORDING METHOD, AND INFORMATION REPRODUCING METHOD USING THE SAME

(76) Inventor: Anatoly M. Smolovich, 6-2-27 Volokolamsky proezd, Moscow (RU) 125 424

( * ) Notice: Subject to any disclaimer, the term of this patent is extended or adjusted under 35 U.S.C. 154(b) by 1238 days.

(21) Appl. No.: 11/387,741

(22) Filed: Mar. 24, 2006

(65) Prior Publication Data

US 2006/0233086 A1    Oct. 19, 2006

Related U.S. Application Data

(60) Provisional application No. 60/672,552, filed on Apr. 19, 2005.

(51) Int. Cl.
*G11B 7/20* (2006.01)

(52) U.S. Cl. .................. 369/94; 369/109.02; 369/275.4; 369/284; 369/285

(58) Field of Classification Search ............... 369/94, 369/109.02, 275.4, 284, 285; 726/26, 27, 726/30, 32, 33
See application file for complete search history.

(56) References Cited

U.S. PATENT DOCUMENTS

| | | | | |
|---|---|---|---|---|
| 4,674,070 A * | 6/1987 | Tajima et al. | ............ | 369/44.37 |
| 5,031,162 A * | 7/1991 | Morimoto et al. | ........ | 369/13.35 |
| 6,540,397 B2 * | 4/2003 | Yoshinari et al. | ............ | 368/286 |
| 6,889,002 B1 * | 5/2005 | Hayashi et al. | ............. | 386/126 |
| 7,394,745 B2 * | 7/2008 | Miyatake | ............... | 369/112.01 |
| 2003/0026189 A1 * | 2/2003 | Richter et al. | .................. | 369/94 |
| 2004/0196759 A1 * | 10/2004 | Ishibashi et al. | ......... | 369/47.19 |
| 2005/0063293 A1 * | 3/2005 | Smolovich et al. | ....... | 369/275.4 |
| 2010/0110870 A1 * | 5/2010 | Kondo et al. | ............. | 369/275.4 |

* cited by examiner

*Primary Examiner*—Wayne R Young
*Assistant Examiner*—Brenda Bernardi

(57) ABSTRACT

Multilayer optical disk is recordable or partly recordable. Parallel reading of information data from the group of layers by the same focused laser beam is possible. Only one layer of said group has the guide grooves for tracking. Alignment of the information data disposition on the layers of the group is provided. The signals reflected from the different layers of the group have different tilts and are directed onto the different photodetectors. Optical disk management for preventing its illegal use is proposed.

19 Claims, 4 Drawing Sheets

MULTIPLE LAYER OPTICAL DISK, INFORMATION RECORDING METHOD, AND INFORMATION REPRODUCING METHOD USING THE SAME

RELATED U.S. APPLICATION DATA

Provisional patent application (APPL. No. 60/672,552) was filed by Apr. 19, 2005.

REFERENCE CITED

| U.S. Patent Documents | | | |
|---|---|---|---|
| 4090031 | May, 1978 | Russell | 358/130 |
| 4310916 | January, 1982 | Dil | 369/109.02 |
| 4325135 | April, 1982 | Dil et al | 369/109.02 |
| 4450553 | May, 1984 | Holster et al. | 369/94. |
| 4534021 | August, 1985 | Smith | 369/47 |
| 4569038 | February, 1986 | Nagashima | 369/44. |
| 4744070 | May, 1988 | Takemura et al. | 369/44.26 |
| 5126996 | June, 1992 | Iida et al. | 369/283. |
| 5202875 | April, 1993 | Rosen et al. | 369/94. |
| 5251198 | October, 1993 | Strickler | 369/110. |
| 5303225 | April, 1994 | Satoh | 369/275.3 |
| 5373499 | December, 1994 | Imaino et al. | 369/275.4 |
| 5511057 | April, 1996 | Holtslag et al. | 369/94. |
| 5608715 | March, 1997 | Yokogawa et al. | 369/275. |
| 5615186 | March, 1997 | Rosen et al. | 369/44.24 |
| 5625609 | April, 1997 | Latta et al. | 369/94. |
| 5627816 | May, 1997 | Ito et al. | 369/275.1 |
| 5640382 | June, 1997 | Florczak et al. | 368/275.1 |
| 5645908 | July, 1997 | Shin | 428/64.1 |
| 5702792 | December, 1997 | Iida et al. | 428/64.1 |
| 5708652 | January, 1998 | Ohki et al. | 369/275. |
| 5745473 | April, 1998 | Best et al. | 369/275.1 |
| 5761187 | June, 1998 | Kaneko et al. | 369/275.1 |
| 5764619 | June, 1998 | Nishiuchi et al. | 369/275.1 |
| 5766717 | June, 1998 | Kaneko et al. | 428/64.1 |
| 5828648 | October, 1998 | Takasu et al. | 369/275.1 |
| 5871881 | February, 1999 | Nishida et al. | 430/270.11 |
| 5878018 | March, 1999 | Moriya et al. | 369/275.1 |
| 5989670 | November, 1999 | Kaneko et al. | 428/64.1 |
| 6030678 | February, 2000 | Aratani | 428/64.1 |
| 6083598 | July, 2000 | Ohkubo et al. | 428/64.1 |
| 6160787 | December, 2000 | Marquardt, Jr. et al. | 369/275.1 |
| 6241843 | June, 2001 | Kaneko et al. | 156/245 |
| 6537637 | March, 2003 | Kaneko et al. | 428/64.1 |
| 6728197 | April, 2004 | Miyamoto et al. | 369/275.4 |
| Appl. 10/942,057 | September, 2004 | Smolovich et al. | 369/275.4 |

BACKGROUND OF THE INVENTION

1. Field of the Invention

The present invention relates to an optical disk of the type from which the recorded information is reproduced by focusing a laser beam thereon with an objective lens and detecting the reflected light beams with photodetectors. Also the invention relates to methods of information recording, reproducing, and optical disk management for preventing its illegal use.

2. Description of the Related Art

The use of multiple data layers is an effective way to increase the capacity of an optical disk. Different variants of such disks were proposed in many patents (for example U.S. Pat. Nos. 4,090,031; 4,450,553; 5,126,996; and 6,241,843). The semitransparent layers that were used there are thin metal films placed inside the transparent polymeric material. Each layer contains the preformed tracking grooves with information pits recorded inside each groove. The reading beam is scattered by pits and is reflected by the smooth parts of the layer. The relief depth of the data layer is less than one micrometer, while the usual disk thickness is 1.2 mm. Therefore, the employment of the third dimension has great potential for the enhancement of the disk capacity.

However, the technological development in this direction is limited due to the interlayer cross-talks during the optical reading. To reduce the interlayer cross-talks the distance between layers should be increased. On the other hand, there are difficulties with the spherical aberration at the large interlayer separation: the marginal light rays are focused at a higher point than central rays due to the influence of the substrate. The aberration can be compensated only for a certain distance from the optical disk surface to the plane of focusing (U.S. Pat. Nos. 5,251,198 and 5,625,609). For this reason the thickness of the transparent slab of the main disk body, through which the beam passes, must not vary by more than 100 micrometers. That limits the number of data surfaces, which could be practically realized. Thus, the above obstacles currently prevent the design of new 3D optical disks with a super-high capacity.

V-shaped grooves were proposed for the single data layer optical disks (for example U.S. Pat. No. 4,534,021) where the neighbor grooves containing the information pits were inclined in opposite directions. This allowed to decrease the cross-talks between the neighbor grooves and gave the possibility of increasing the disk capacity.

BRIEF SUMMARY OF THE INVENTION

The invention is directed on increasing of the optical disks capacity and reading speed. The multilayered optical disk of the present invention contains at least one group of data layers situated within the distance of objective focus depth. Parallel reading of the information from said group of data layers by the same focused laser beam is suggested. Two main problems appear in this case. The first one is an alignment of the information pits disposition on the layers of said group of data layers. The second one is a separation of the signals from the said layers. The problem of alignment is hard in conditions of the mass disks production by the molding or stamping technologies. The problem of signal separation is connected with condition that said layers are very close to each other. Also, said layers at the same moment should be in the focus of an objective. The signals reflected from said layers should be separated in some manner.

In order to solve the problem of the information alignment the only one layer of the said group of data layers should have the tracking grooves. The other layer/layers from said group of data layers do not have grooves or have grooves, which are not connected with tracking. Said other layer/layers from said group of data layers are recordable. In other words the information onto the said layer/layers could be recorded on the user's computer CD/DVD recording device. The different types of recordable layers (write once read many or rewriteable) and the different mechanisms of recording (ablation, magneto-optical, or phase-changing processes, etc.) could be used. During recording tracking should be performed with the said tracking grooves of the one layer of the group. The same tracking grooves are also used during information reading.

The signal separation is provided by the different local surface slant of the layers from said group of data layers. The pregrooved layer has the slant grooves simular to the blazed diffraction grating grooves. The reading beam reflected from a wall of the said groove would have a tilt with respect to the normal to the disk plane. The beam reflected from the other layers of said group of data layers would be normal to the optical disk plane or would have the different tilt. So, the signals reflected from the different layers of said group of data layers would have the different tilts and could be directed onto the different photodetectors.

DETAILED DESCRIPTION OF THE INVENTION

First Embodiment

Figure 1:
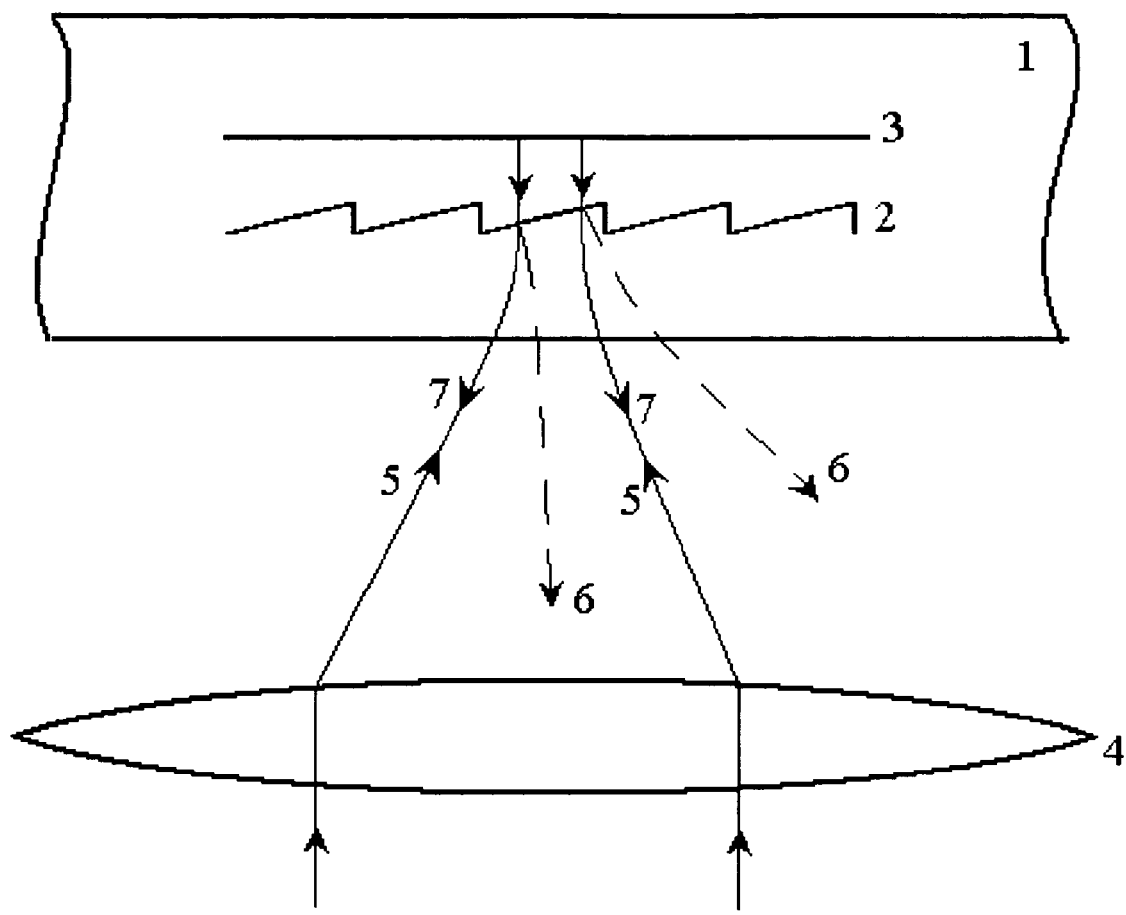
FIG. 1 is a schematic cross sectional view showing essential portions of the structure of the multilayer optical disk according the first embodiment and the scheme of reading.

The optical disk (FIG. 1) contains main disk body 1 made from a material substantially transparent to radiation with which the recorded information is to be reproduced and two data layers (2 and 3). Semitransparent data layer 2 is pregrooved and prerecorded. Data layer 3 is recordable. It does not have tracking grooves. The distance between layers 1 and 2 should be less than the objective focus depth. Focus depth is proportional to $\lambda_1/(NA_1)^2$, where $\lambda_1$ is the reading wavelength, $NA_1$ is the numerical aperture of the reading beam.

Figure 2A:
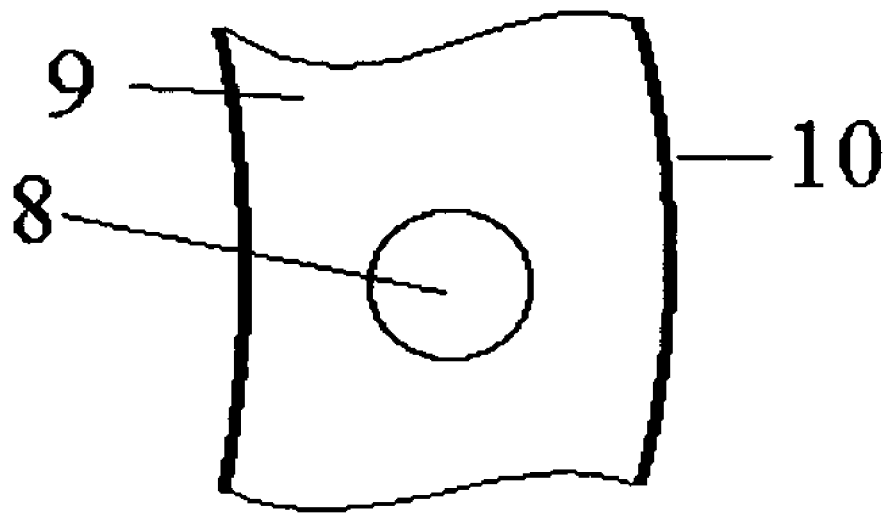
FIGS. 2A and 2B are views of an enlarged fragment of the groove for tracking: 2A is view from the top, 2B is radial cross section.
Figure 2B:
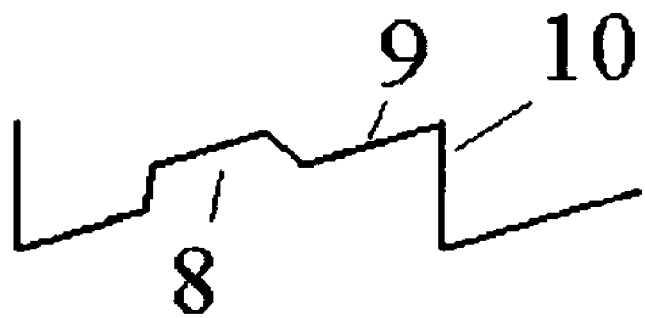

The tracking grooves of layer 2 are similar to the grooves of the blazed diffraction grating. The enlarged groove scheme of layer 2 is shown on FIGS. 2A and 2B. FIG. 2A is a view from the top and FIG. 2B is a cross-section along the radial direction. The information pits 8 are placed only on the working surface 9 of the groove. Surface 9 is inclined at some angle to the disk plane. The second surface 10 of the groove is approximately normal to the disk plane or to the plane of the working surface. The information pits on data layer 2 are prerecorded. Contrary, the information onto data layer 3 should be recorded on the user's computer. The tracking grooves of layer 2 should be used during this process. This provides the alignment of the information pits disposition between layers 2 and 3. This alignment is necessary to provide simultaneous information reading from layers 2 and 3 by the same focused reading beam.

During reproducing (FIG. 1) the objective lens 4 focuses the reading beam 5 onto layers 2 and 3 by standard technique. The illuminating leg is not shown on FIG. 1. The aperture of the reading beam 5 should be less than the aperture of the objective lens 4. The focused beam spot has the minimum size on layers 2 and 3 at the same moment. The reading beam axis is normal to the disk plane. The reading beam is scattered or reflected from the grooves area which contains or not the information pit, respectively. The beam 6 reflected from layer 2 has a conical form and its axis is inclined to the disk normal. The beam 7 reflected from layer 3 also has a conical form with axis normal to the disk plane. Both reflected beams pass through the objective lens 4. They have overlapping angular parts and also separated ones. These separated angular parts of the beams should be directed onto the different photodetectors.

Presence of the recordable layer together with the prerecorded layer could protect the optical disk against its illegal using. For instance, the information prerecorded on layer 2 could be organized in such a way, that its use is possible only after recording information onto layer 3. During this procedure the unique parameters of the user's computer should be also recorded onto layer 3. Then information from layers 2 and 3 can be used only jointly during parallel reading of said layers. Thus, after recording of layer 3 impossibility of the optical disk using on any other computer could be provided. This recording can be combined with installation of the programs recorded on layer 2.

Second Embodiment

Figure 3:
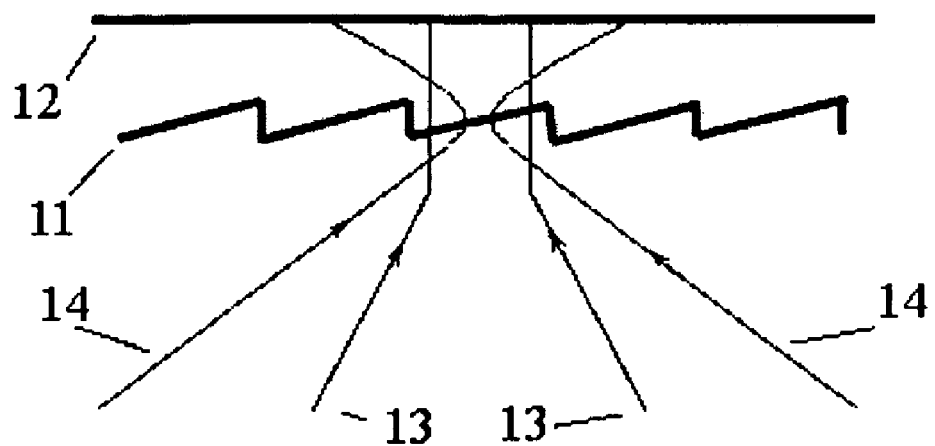
FIG. 3 is a scheme of recording onto the lower layer.

The optical disk contains at least one group of two recordable neighbor layers for recording on the user's computer. The scheme of recording is shown on FIG. 3. Layer 11 is pregrooved. It has a system of the slant tracking grooves similar to the blazed diffraction grating grooves. Contrary, layer 12 does not have guide grooves for tracking. Layer 11 contains a standard magneto-optical material. Layer 12 contains dye or phase-changing material.

Two sorts of laser beams are used during recording. Beam 13 with a wavelength $\lambda_1$ is used only for tracking. It has numerical aperture $NA_1$ less than the full aperture of the objective. Beam 14 is used directly for recording. Its wavelength $\lambda_0$ is shorter than $\lambda_1$. The numerical aperture $NA_0$ of beam 14 is equal to the aperture of the objective. Beam 14 is also used for obtaining of the reflected signal that provides focus correction. The distance L between layers 11 and 12 satisfies the following conditions:

$$\lambda_0/(NA_0)^2 < L < \lambda_1/(NA_1)^2$$

Figure 4:
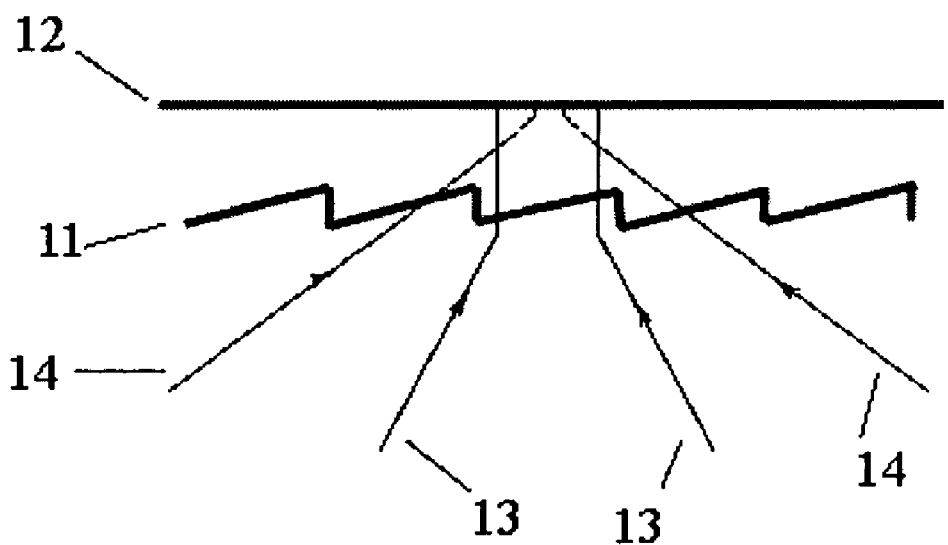
FIG. 4 is a scheme of recording onto the upper layer.

In this case the recording beam 14 is sequentially focused onto layer 11 (FIG. 3) and layer 12 (FIG. 4). During both operations tracking is performed by beam 13 using tracking grooves of layer 11. During recording the photodetectors controlling tracking and focusing should have the different bands of spectral sensitivity.

During reproducing the only beam with the wavelength $\lambda_1$ and the numerical aperture $NA_1$ is used both for tracking and for reading. In this case both layer 11 and 12 are in focus at the same moment. The tracking grooves of layer 11 are used. The signals reflected from layers 11 and 12 are directed onto different photodetectors as it was described in the first embodiment. This provides parallel reading from layers 11 and 12.

Third Embodiment

The optical disk contains several groups of data layers. The layers of the each one of said groups are supposed to be read in parallel at the same moment. Each of said groups should contain only one layer with the system of spiral or concentric guide grooves for tracking. Said guide grooves could have a standard profile of radial section shown on FIG. 5B or a slant profile of radial section similar to layer 11 on FIG. 3. Besides said group of layers could contain a layer without grooves similar to layer 12 on FIG. 3. Apart from the above said group of data layers could contain several data layers having a system of slant grooves not connected with tracking with different planes and angles of inclination.

Figure 5A:
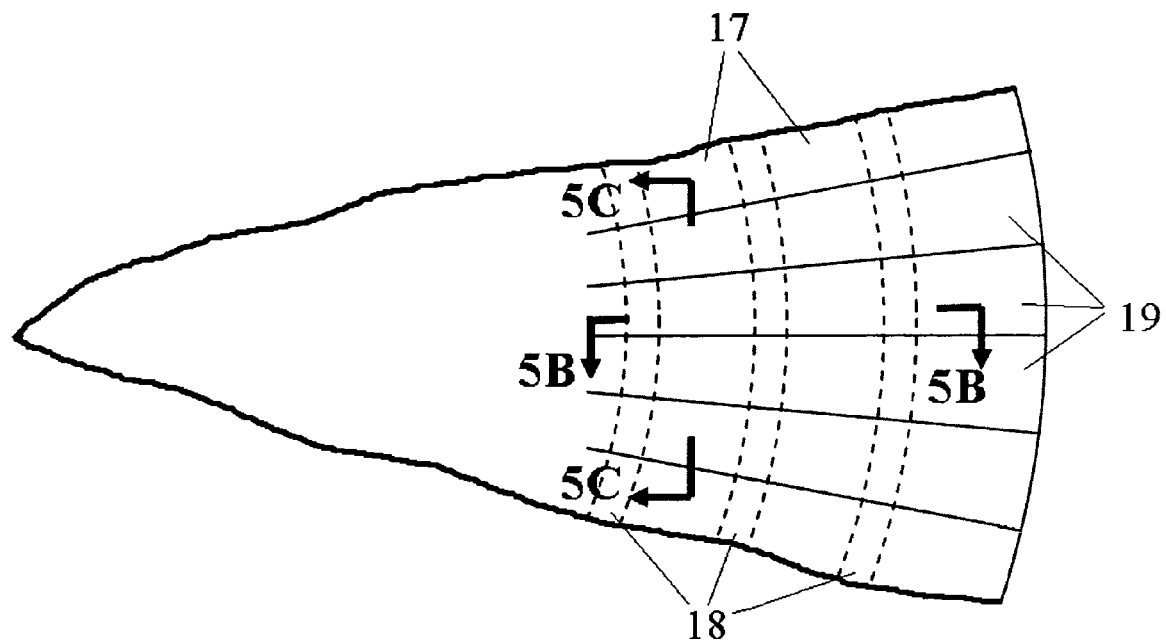
FIGS. 5A, 5B, and 5C are views of a fragment of the optical disk according to the third embodiment: 5A is a top view, 5B is a radial section view through line 5B-5B of FIGS. 5A, 5C is a section view through line 5C-5C of FIG. 5A.
Figure 5B:
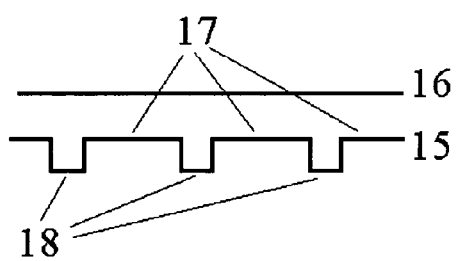
Figure 5C:
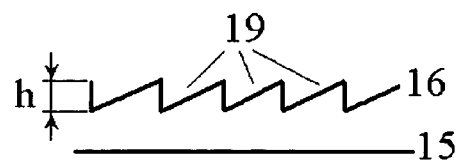

In easiest case said group of data layers consists of two layers 15 and 16 (FIGS. 5A, 5B, and 5C). A top view on two said layers is shown on FIG. 5A. FIG. 5B is a radial section view through line 5B-5B of FIG. 5A. FIG. 5C is a section view through line 5C-5C of FIG. 5A. Layer 15 (FIG. 5B) has a standard spiral or concentric system of lands 17 and grooves 18 for tracking. The edges of said lands and grooves are shown on FIG. 5A by dashed lines. Layer 16 (FIG. 5C) has the relief periodic structure with radial directed grooves 19, which are not connected with tracking. Said grooves are similar to the grooves of the blazed diffraction grating. The jump h of the relief depth between the neighbor grooves should be approximately equal to lambda..sub.1 n/2 where lambda..sub.1 is the wavelength of reproducing, n is the refractive index of the main disk body material. In that case the reflected beam will not be essentially disturbed by the border between neighbor grooves during reproducing. This allows to avoid alignment of the information pits position with the definite place of the groove. When the grooves are radial directed their width increases with the distance from the center of the disk. The jump of the relief depth between the neighbor grooves will also increase. To keep its variation within short limits near the value lambda..sub.1 n/2 the working area of the optical disk should be divided to the annular fragments. The number of the grooves inside the annular fragment increases proportional to its radius. Dispositions of the grooves inside the different annular fragments are independent. The grooves not connected with tracking could be directed not only along the disk radius but also could have some definite angle with it.

The both layers are recordable. Layer 15 contains a standard magneto-optical material. Layer 16 contains dye or phase-changing material. Similar to the second embodiment the two sorts of focused laser beams with the different wavelengths and numerical apertures are used during recording. One beam is used for tracking and other for recording. The guide grooves of layer 15 are used for tracking during recording and also during reproducing.

Reproducing from layers 15 and 16 is performed in parallel by the same beam. The signal reflected from layer 15 is normal to the disk plain. The signal reflected from layer 16 is inclined in the plane normal to the disk radius. The optical disk could contain the other information layers except layers 15 and 16. The different planes of inclination of the beams reflected from the different layers could be useful for increasing the number of layers. The signals reflected from the different layers should be directed onto the different photodetectors. This is possible due to the different planes or/and angles of inclination of said signals. Note that in case of the grooves, which are not connected with tracking, the displacement of the reflected beam due to the disk rotation has an order of the groove height. So, it is negligible.

What is claimed is:

1. An optical disk for use by a recording/reproducing device comprising:
    a body made from a material penetrable by a laser beam at a focus depth,
    a plurality of data layers provided one under another in the body and including
        a one data layer containing a prerecorded information,
        an other data layer configured to receive a recordable information, the data layers being spaced apart at a distance smaller than the focus depth to provide for the laser beam to simultaneously scan the data layers with respective prerecorded and recordable information upon actuating the recording/reproducing device, wherein information pits of the prerecorded and recordable information are aligned during scanning.

2. The optical disk according to claim 1, wherein the one data layer includes a groove with the prerecorded information, the other data layer being flat.

3. The optical disk according to claim 2, wherein the groove of the one data layer has a working wall and a lateral wall, the working wall being inclined at an angle with respect to a plane of the optical disk, and the lateral wall being substantially normal to the working wall or to the plane of the optical disc.

4. The optical disk according to claim 3, wherein the first side wall contains the prerecorded information.

5. The optical disc according to claim 1, wherein the body is provided with a plurality of additional one data layers and a plurality of additional other layers combined in a plurality of groups, each of the group including the one data layer and multiple other layers.

6. The optical disc of claim 1, wherein the laser beam is radiated at a desired wavelength ($\lambda$) and with a desired numerical aperture (NA), the focus depth being proportional to the $\lambda$/NA.

7. The optical disc of claim 2, wherein the groove of the one data layer is selected from the group consisting of spiral and concentric guide grooves.

8. A method of reproducing information recorded on a plurality of data layers of an optical disc by an electronic recording/reproducing device, comprising:
    recording information unique to the electronic device on at least one of the other data layer so that pit locations of the information on the one data layer and a data layer with prerecorded information are aligned, and
    simultaneously scanning the plurality of data layers by the focused laser beam to reproduce the information from the data layers.

9. The method of claim 8 further comprising focusing a laser beam penetrating the optical disc at a focus depth so as to irradiate the data layers spaced one under another at a distance smaller than the focus depth, wherein one of the data layers with the prerecorded information is configured with a groove, the groove being selected from the group consisting of spiral grooves, concentric grooves and a combination of these.

10. The method of claim 9, wherein the recordable information is received from a source selected from the group consisting of the one data layer and recording/reproducing device.

11. A method of preventing illegal use of an optical disc associated with an electronic recording/reproducing device, the optical disk comprising a plurality of spaced data layers located one under another, one of the data layers having prerecorded information, an other layer being configured to receive a recordable information, the method comprising:
    recording recordable information unique to the electronic recording/reproducing device on the other layer; and
    simultaneously scanning the one and other data layers by a single laser beam so as to reproduce the information prerecorded on the one layer only if the prerecorded and recorded information match, wherein information pits of the prerecorded information and information pits of the recorded information are aligned with one another during the scanning.

12. The method according to claim 11, wherein the recording further includes installing programs on the other layer.

13. The method according to claim 11, wherein the scanning includes penetrating the laser beam into the optical disc at a focus depth proportional to a ratio between a wavelength of the laser beam and a numerical aperture thereof, the one and other layers being spaced apart at a distance not exceeding the focus depth, the one data layer having a guide groove for tracking selected from the group which consists of spiral and concentric guide grooves and provided with a triangularly shaped cross-section which approximates a cross-section of a right triangle.

14. The method according to claim 13, wherein one wall of the groove extends substantially parallel to a plane of the optical disk or inclined thereto.

15. The method according to claim 13 further comprising
providing an objective lens configured to focus the laser beam on the two data layers,
providing a plurality of photodetectors configured to detect a reflected beam.

16. The method of claim 11, wherein the recordation includes receiving the information from a source selected from the group consisting of the one data layer and the electronic recording/reproducing device.

17. A method of an optical disk management for preventing its illegal use,
said optical disk comprising:
    a disk body made from a material substantially transparent to recording and reproducing laser beam,
    a data layer/layers placed inside said disk body,
    said data layer/layers contains/contain read only type portions with prerecorded information and write once read many type portions,
    wherein information prerecorded on said read only type portions is organized in such a way, that its use is possible only after recording some information onto said write once read many type portions,
said method comprising the steps of:
    recording data from said read only type portions of the optical disk and from other sources onto said write once read many type portions of the optical disk by the user's optical disk recording/reproducing device during the first using of the optical disk,
    wherein said data to be recorded includes the unique parameters of the user's optical disk recording/reproducing device,
    reproducing data from the optical disk,
    at the beginning of said reproducing comparing of the unique parameters of the optical disk recording/reproducing device with the parameters recorded on the write once read many type portions of the optical disk,
    permitting of the optical disk further reproducing only when unique parameters of the optical disk recording/reproducing device coincide with the parameters recorded on the write once read many type portions of the optical disk.

18. The method of an optical disk management for preventing its illegal use according to claim 17,
wherein said step recording is combined with installation of the programs prerecorded on said read only type portions of the optical disk.

19. The method of an optical disk management for preventing its illegal use according to claim 17,
wherein said optical disk further comprising:
at least one group of at data layers placed inside said disk body, wherein the maximum distance between the two data layers of said group is less than the focus depth,
wherein the focus depth is proportional to $\lambda/(NA)^2$,
where $\lambda$ is the reproducing wavelength of and the NA is a numerical aperture of the reproducing laser beam,
one of the at least two data layers of said at least one group having a prerecorded guide groove for tracking selected from the group consisting of spiral and concentric guide grooves, wherein said one data layer is read only type,
said guide grooves for tracking comprise a working wall, said working wall could be parallel to the plane of the optical disk or could be inclined at some angle with respect to the plane of the optical disk,
said other data layer is write once read many type,
said method wherein said step reproducing comprises:
configuring a laser system emitting a laser beam,
providing an objective lens configured to focus the laser beam on said one group of at least two data layers,
scanning of the data layers of said group of least two data layers by the focused laser beam,
providing a plurality of photodetectors configured to detect beams which are reflected from the disk,
directing of the light beams reflected from data layers onto the photodetectors,
detecting of the light beams reflected from data layers with said photodetectors,
wherein said focusing is performed simultaneously onto all data layers of said group of at least two data layers,
said scanning of the all data layers of said group of at least two data layers is performed using prerecorded guide grooves for tracking of said one data layer of said group of at least two data layers,
said directing of the reflected light beams onto the photodetectors is performed in such a way that the light beams reflected from the data layers having the different slant of the surfaces containing information pits are directed onto the different photodetectors,
said detecting of the light beams reflected by said data layers of said group of at least two data layers with said photodetectors is performed in parallel.

* * * * *